No. 808,014. PATENTED DEC. 19, 1905.
E. T. COPE.
STEAM ENGINE VALVE.
APPLICATION FILED JULY 7, 1904.

WITNESSES:

INVENTOR
E. T. Cope
by Barker & Haynes
his attys

UNITED STATES PATENT OFFICE.

EDGE T. COPE, OF SALEM, OHIO, ASSIGNOR TO BUCKEYE ENGINE COMPANY, OF SALEM, OHIO, A CORPORATION OF OHIO.

STEAM-ENGINE VALVE.

No. 808,014.     Specification of Letters Patent.     Patented Dec. 19, 1905.

Application filed July 7, 1904. Serial No. 215,574.

*To all whom it may concern:*

Be it known that I, EDGE T. COPE, of Salem, Columbiana county, Ohio, have invented a new and useful Steam-Engine Valve, of which the following is a full, clear, and exact description, reference being had to the accompanying drawings, forming part of this specification, in which—

Figure 1:
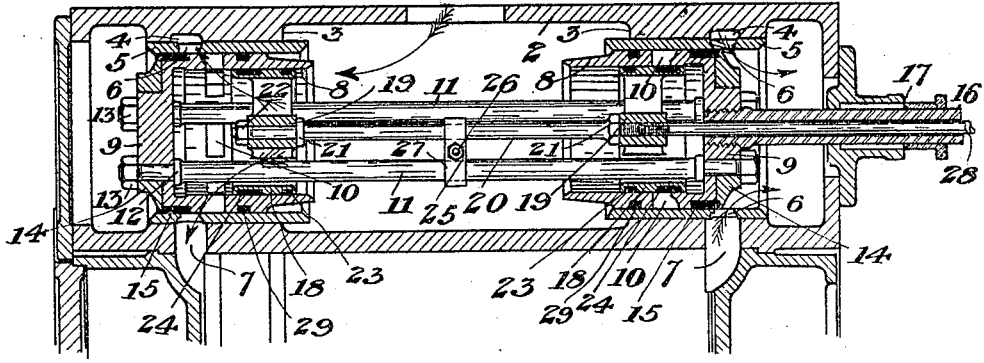
Figure 2:
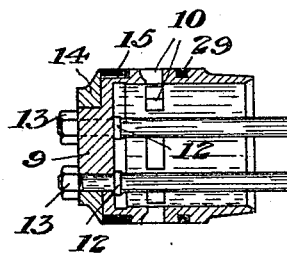
Figure 3:
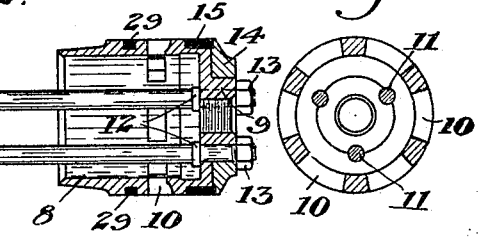
Figures 4, 5:
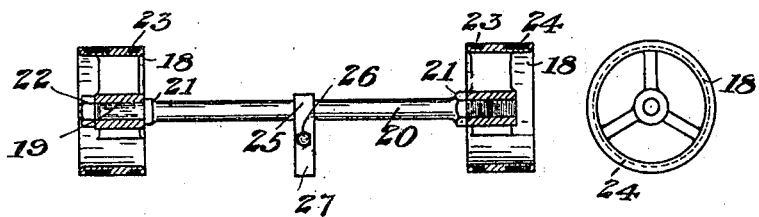
Figure 6:
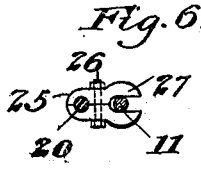

Figure 1 is a longitudinal vertical section showing the steam-chest of an engine provided with my improved valve. Fig. 2 is a longitudinal section of the main distribution-valve. Fig. 3 is a cross-section of the same through one of the end portions. Fig. 4 is a longitudinal section of the cut-off valve. Fig. 5 is an end view of the same, and Fig. 6 is a detail view of the cut-off-valve-stem clamp.

My invention relates to that class of steam-engine valves wherein a cylindrical cut-off valve moves within a cylindrical main distribution-valve; and the object of the invention is to provide a light, simple, and cheap construction of this character which will be balanced and give efficient action.

In the drawings, 2 represents the steam-chest, having near each end bored-out portions 3 3 with annular channels 4 4. In these bored-out portions are seated the valve-bushings 5, which consist of short cylinders, with annular rows of ports 6 registering with the channel 4, which connects with the ports 7, leading into the cylinder.

Within the valve cages or bushings slide the tubular end portions 8 of the main distribution-valve. These hollow end portions are formed with integral closed outer ends 9 and with an intermediate annular row of ports 10. These portions are connected by the stretcher-rods 11, of which I have shown three spaced equidistantly, these rods having collars 12 arranged to fit against the inner faces of the heads 9 and provided with screw-threaded ends having nuts 13. The heads 9 are provided with outer annular recesses, in which are seated the annular cover plates or rings 14, which contact with the ends of packings-rings 15, seated in recesses in the cylindrical ends. The nuts 13 when screwed to place clamp the cylindrical ends in spaced position and at the same time clamp the rings 14, thus holding the end packing-rings in place. Into the head 9 of one of the cylindrical ends is screwed a tubular rod 16, which extends outwardly through stuffing-box 17 and is connected to the actuating mechanism for reciprocating the main valve.

The cut-off valve consists of two short cylinders or rings 18, having spiders connected to central hubs 19 at the axial center of the valve. Into one of these hubs is screwed the end of the stem 20, having collars 21, which fit against the hubs, the other end having a nut 22 screwed against the outer end of the other hub. The cut-off valve is provided with suitable packing-rings 23 and 24.

To prevent turning of the cut-off valve within the main valve, I provide a two-part clamp 25, which is gripped to the central portion of the stem 20 by bolt 26 and has a slotted guide 27, which engages one of the stretcher-rods 11. The cut-off valve is actuated by the stem 28, which is screwed into one hub and extends out through the tubular stem 16 of the main valve.

The main valve is provided with packing-rings 29 on the opposite side of the ports to the rings 15, and the valves are reciprocated in the ordinary manner, the cut-off valve being controlled by the governor.

The advantages of my invention result from the cheap and simple construction and from the lessening in weight of the valves. The guide on the cut-off valve prevents its rotation, and the heads of the main valve may be cast integral with the tubular portions.

Changes may be made in the form and arrangement of the parts without departing from my invention.

I claim—

1. A main steam-engine valve having hollow cylindrical ends with closed heads, stretcher-rods extending between and bolted to the heads, and a cut-off valve surrounding said rods and movable within the main valve; substantially as described.

2. A steam-engine valve having two cylindrical end portions with heads, packing-rings for the cylindrical portions held by cover-plates on the heads, stretcher-rods between the cylindrical end portions, and a cut-off valve surrounding said rods and movable within the main valve; substantially as described.

3. A main steam-engine valve having a cylindrical end with an annular row of ports and an integral closed head, a packing-ring near the outer end of the cylindrical portion, a clamping plate or ring on the head holding the packing in place, stretcher-rods having nuts arranged to hold the clamping ring or plate in place, and a cut-off valve movable within the main valve; substantially as described.

4. In a steam-engine valve, a main distribution-valve having cylindrical end portions, a cut-off valve having rings movable within the end portions, stretcher-rods between the end portions of the main valve, a stem between the rings of the cut-off valve, and an internal guide carried by the cut-off valve and slidingly engaging a stretcher-rod and preventing rotation of the cut-off valve; substantially as described.

5. A main distribution-valve, a cut-off valve movable therein, and a clamp on the cut-off valve engaging a stretcher-rod on the main valve to prevent rotation of the cut-off valve; substantially as described.

In testimony whereof I have hereunto set my hand.

EDGE T. COPE.

Witnesses:
C. H. WEEKS,
C. F. TOUZIEN.